US007082815B1

(12) United States Patent
Matsubara et al.

(10) Patent No.: US 7,082,815 B1
(45) Date of Patent: Aug. 1, 2006

(54) EVAPORATED FUEL TREATMENT DEVICE OF INTERNAL COMBUSTION ENGINE

(75) Inventors: Takuji Matsubara, Yokosuka (JP); Toru Kidokoro, Torrance, CA (US); Yoshihiko Hyodo, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/387,933

(22) Filed: Mar. 24, 2006

Related U.S. Application Data

(62) Division of application No. 10/700,669, filed on Nov. 5, 2003, now Pat. No. 7,043,972.

(30) Foreign Application Priority Data

Nov. 5, 2002 (JP) ............................ 2002-321687

(51) Int. Cl.
*G01M 15/00* (2006.01)

(52) U.S. Cl. .................................................... 73/118.1

(58) Field of Classification Search .................... 73/40, 73/46, 47, 49.7, 116, 117.2, 117.3, 118.1, 73/119 R See application file for complete search history.

(56) References Cited

U.S. PATENT DOCUMENTS

| | | | | |
|---|---|---|---|---|
| 5,816,222 | A | 10/1998 | Kidokoro | |
| 5,873,352 | A | 2/1999 | Kidokoro et al. | |
| 6,405,718 | B1 * | 6/2002 | Yoshioka et al. | 123/520 |
| 6,796,295 | B1 * | 9/2004 | Kidokoro et al. | 123/520 |
| 6,837,224 | B1 | 1/2005 | Kidokoro et al. | |
| 6,988,396 | B1 * | 1/2006 | Matsubara et al. | 73/118.1 |
| 2002/0189596 | A1 * | 12/2002 | Hanazaki et al. | 123/520 |
| 2003/0192370 | A1 * | 10/2003 | Amano et al. | 73/118.1 |
| 2004/0089063 | A1 | 5/2004 | Matsubara et al. | |
| 2004/0089064 | A1 | 5/2004 | Kidokoro et al. | |

FOREIGN PATENT DOCUMENTS

| | | |
|---|---|---|
| JP | 06-026408 | 2/1994 |
| JP | 2000-345927 | 12/2000 |
| JP | 2001-193580 | 7/2001 |
| JP | 2001-342914 | 12/2001 |

* cited by examiner

*Primary Examiner*—Eric S. McCall
(74) *Attorney, Agent, or Firm*—Kenyon & Kenyon LLP

(57) ABSTRACT

Disclosed is an evaporated fuel treatment device that includes a sealing valve installed between a fuel tank and a canister, a pump module pressure sensor for detecting the pressure on the canister side pressure, and a tank internal pressure sensor for detecting a tank internal pressure. Upon detection of a significant difference between the canister side pressure and tank internal pressure, the device concludes that no open failure exists in the sealing valve.

1 Claim, 4 Drawing Sheets

(A)

(B)

EVAPORATED FUEL TREATMENT DEVICE OF INTERNAL COMBUSTION ENGINE

This is a division of application Ser. No. 10/700,669 filed 5 Nov. 2003, now U.S. Pat. No. 7,043,972 which claims priority to Japanese Patent Application No. 2002-321687 filed 5 Nov. 2002, the contents of which are incorporated herein by reference.

BACKGROUND OF THE INVENTION

1. Field of the Invention

The present invention relates to an evaporated fuel treatment device, and more particularly to an evaporated fuel treatment device for treating evaporated fuel generated in a fuel tank without emitting it to the atmosphere.

2. Background Art

A conventional evaporated fuel treatment device disclosed, for instance, by JP-A No. 2001-342914 is equipped with a canister that communicates with a fuel tank. This device is also equipped with a purge path for introducing an intake negative pressure into the canister as well as a bypass path that is positioned between the fuel tank and canister for introducing a negative pressure into the fuel tank. The bypass path is provided with a bypass control valve, which controls the continuity of the bypass path.

If an open failure occurs in the bypass control valve of the above conventional device, the continuity between the canister and the fuel tank cannot be cut so that normal operations cannot be assured. Therefore, the above conventional device has a function for detecting an open failure in the bypass control valve by a method described below.

More specifically, when the above conventional device needs to detect an open failure in the bypass control valve, it first issues a valve close instruction to the bypass control valve while introducing an intake negative pressure into the canister. Next, the conventional device monitors a canister internal pressure and tank internal pressure to check whether the tank internal pressure significantly follows a change in the canister internal pressure.

If the bypass control valve is properly closed, the bypass control valve shuts off the intake negative pressure introduced into the canister. In this instance, therefore, the tank internal pressure does not follow the canister internal pressure. If, on the other hand, the bypass control valve is open in spite of the issued valve close instruction, the intake negative pressure introduced into the canister is also introduced into the fuel tank. As a result, the tank internal pressure significantly follows a change in the canister internal pressure.

Therefore, if the tank internal pressure does not significantly follow a change in the canister internal pressure, the above conventional device concludes that the bypass control valve is normal. If, on the other hand, the tank internal pressure significantly follows a change in the canister internal pressure, the above conventional device concludes that an open failure exists in the bypass control valve. As described above, the foregoing conventional device is capable of judging in accordance with the changes in the canister internal pressure and tank internal pressure whether an open failure exists in the bypass control valve.

In the above conventional device, however, the tank internal pressure varies not only with the introduction of intake negative pressure but also with fuel consumption and evaporated fuel generation. To accurately judge whether the tank internal pressure adequately follows a change the canister internal pressure, it is necessary to remove the influence of fuel consumption and evaporated fuel generation. In reality, therefore, it is necessary to exercise complicated control so as to yield an accurate diagnostic check result concerning an open failure in the bypass control valve by a method employed by the above conventional device.

SUMMARY OF THE INVENTION

The present invention is made to solve the foregoing problems, and has for its object to provide an evaporated fuel treatment device that is capable of exercising simple control to conduct an accurate diagnostic check for an open failure in a valve mechanism provided in path joining the canister and fuel tank.

The above object of the present invention is achieved by an evaporated fuel treatment device for internal combustion engine that uses a canister to absorb evaporated fuel generated in a fuel tank for evaporated fuel treatment purposes. The device includes a sealing valve for controlling the continuity between the fuel tank and the canister. The device also includes a differential pressure detection unit for detecting the difference between a canister side pressure and a tank internal pressure. The device further includes an open failure normality judgment unit for judging that no open failure exists in the sealing valve when the differential pressure detection unit detects a differential pressure higher than a judgment value.

The above object of the present invention is also achieved by an evaporated fuel treatment device for internal combustion engine that uses a canister to absorb evaporated fuel generated in a fuel tank for evaporated fuel treatment purposes. The device includes a sealing valve for controlling the continuity between the fuel tank and the canister. The device also includes a differential pressure generation condition judgment unit for judging whether a differential pressure generation condition is established. The condition is established when the sealing valve is expected to be closed and differential pressure is expected to be generated between both sides of the sealing valve. A condition establishment differential pressure detection unit is provided for detecting the difference between a canister side pressure and a tank internal pressure when the differential pressure generation condition is established. The device judges that an open failure exists in the sealing valve when the condition establishment differential pressure detection unit does not detect a differential pressure greater than a judgment value.

The above object of the present invention is achieved by an evaporated fuel treatment device for internal combustion engine that uses a canister to absorb evaporated fuel generated in a fuel tank for evaporated fuel treatment purposes. The device includes a sealing valve for controlling the continuity between the fuel tank and the canister. A close failure judgment unit is provided for judging whether a close failure exists in the sealing valve. A pressure introduction unit is provided for introducing pressure into either the canister or the fuel tank in a situation where the sealing valve is closed. A sealing valve open instruction generation unit is also provided for issuing a valve open instruction to the sealing valve in a situation where pressure is introduced into either the canister or the fuel tank by the pressure introduction unit. A check is conducted before and after the issuance of the valve open instruction to judge whether a significant pressure change occurs in the canister or the fuel tank to which pressure is not introduced. The device makes a judgment that an open failure exists in the sealing valve when the significant pressure change is not verified by the pressure change judgment unit under a circumstance where no close failure record exists.

Other objects and further features of the present invention will be apparent from the following detailed description when read in conjunction with the accompanying drawings.

BEST MODE OF CARRYING OUT THE INVENTION

Figure 1:
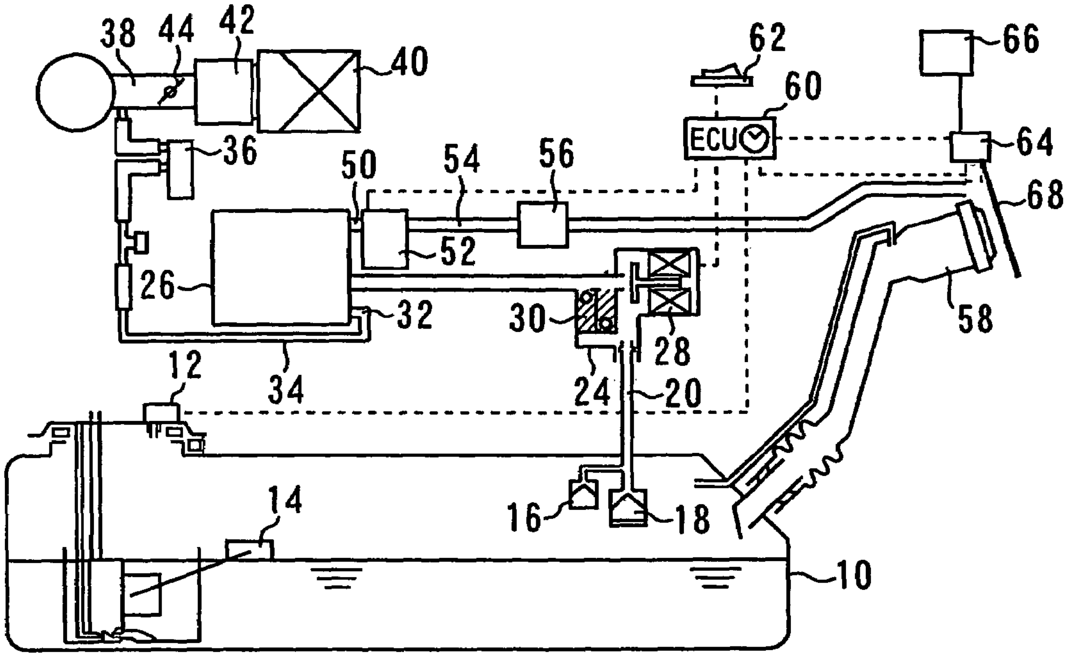
FIGS. 1A and 1B are drawings for describing a structure of a first embodiment of the present invention.
Figure 1:
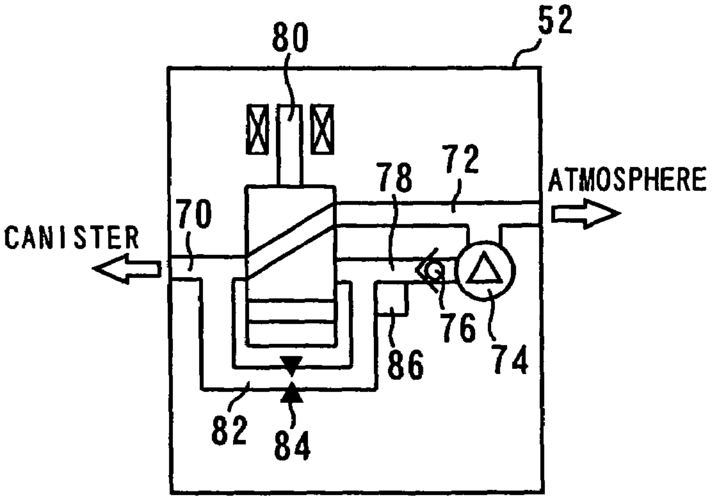

Now, embodiments of the present invention will be described with reference to the drawings. Like reference numerals denote like components throughout the drawings, and redundant descriptions will be omitted.

First Embodiment

[Description of Structure of Device]

FIG. 1A illustrates a structure of an evaporated fuel treatment device according to a first embodiment of the invention. As shown in FIG. 1A, the device according to the present embodiment includes a fuel tank 10. The fuel tank 10 has a tank internal pressure sensor 12 for measuring tank internal pressure Ptnk. The tank internal pressure sensor 12 detects the tank internal pressure Ptnk as relative pressure with respect to atmospheric pressure, and generates output in response to a detection value. A liquid level sensor 14 for detecting a liquid level of fuel is placed in the fuel tank 10.

A vapor passage 20 is connected to the fuel tank 10 via ROVs (Roll Over Valves) 16, 18. The vapor passage 20 has a sealing valve unit 24 on the way thereof, and communicates with a canister 26 at an end thereof. The sealing valve unit 24 has a sealing valve 28 and a pressure control valve 30. The sealing valve 28 is a solenoid valve of a normally closed type, which is closed in a nonenergized state, and opened by a driving signal being supplied from outside. The pressure control valve 30 is a mechanical two-way check valve constituted by a forward relief valve that is opened when pressure of the fuel tank 10 side is sufficiently higher than pressure of the canister 26 side, and a backward relief valve that is opened when the pressure of the canister 26 side is sufficiently higher than the pressure of the fuel tank 10 side. Valve opening pressure of the pressure control valve 30 is set to, for example, about 20 kPa in a forward direction, and about 15 kPa in a backward direction.

The canister 26 has a purge hole 32. A purge passage 34 communicates with the purge hole 32. The purge passage 34 has a purge VSV (Vacuum Switching Valve) 36, and communicates, at an end thereof, with an intake passage 38 of the internal combustion engine. An air filter 40, an airflow meter 42, a throttle valve 44, or the like are provide in the intake passage 38 of the internal combustion engine. The purge passage 34 communicates with the intake passage 38 downstream of the throttle valve 44.

The canister 26 is filled with activated carbon. The evaporated fuel having flown into the canister 26 through the vapor passage 20 is adsorbed by the activated carbon. The canister 26 has an atmosphere hole 50. An atmosphere passage 54 communicates with the atmosphere hole 50 via a negative pressure pump module 52. The atmosphere passage 54 has an air filter 56 on the way thereof. An end of the atmosphere passage 54 is opened to the atmosphere near a refueling port 58 of the fuel tank 10.

As shown in FIG. 1A, the evaporated fuel treatment device according to the present embodiment has an ECU 60. The ECU 60 includes a soak timer for counting an elapsed time during parking of a vehicle. A lid switch 62 and a lid opener opening/closing switch 64 are connected to the ECU 60 together with the tank internal pressure sensor 12, the sealing valve 28, and the negative pressure pump module 52. A lid manual opening/closing device 66 is connected to the lid opener opening/closing switch 64 using a wire.

The lid opener opening/closing switch 64 is a lock mechanism of a lid (lid of a body) 68 that covers the refueling port 58, and unlocks the lid 68 when a lid opening signal is supplied from the ECU 60, or when a predetermined opening operation is performed on the lid manual opening/closing device 66. The lid switch 62 connected to the ECU 60 is a switch for issuing an instruction to unlock the lid 68 to the ECU 60.

FIG. 11B is an enlarged view for illustrating details of the negative pressure pump module 52 shown in FIG. 1A. The negative pressure pump module 52 has a canister side passage 70 communicating with the atmosphere hole 50 of the canister 26, and an atmosphere side passage 72 communicating with the atmosphere. The atmosphere side passage 72 communicates with a pump passage 78 having a pump 74 and a check valve 76.

The negative pressure pump module 52 has a switching valve 80 and a bypass passage 82. The switching valve 80 makes communication between the canister side passage 70 and the atmosphere side passage 72 in the nonenergized state (OFF state), and makes communication between the canister side passage 70 and the pump passage 78 in a state where the driving signal is supplied from outside (ON state). The bypass passage 82, which has a reference orifice 84 with a 0.5 mm diameter on the way thereof, makes communication between the canister side passage 70 and the pump passage 78.

Further, a pump module pressure sensor 86 is incorporated into the negative pressure pump module 52. The pump module pressure sensor 86 can detect pressure in the pump passage 78 at a position between the switching valve 80 and the check valve 76.

[Description of Basic Operations]

Next, basic operations of the evaporated fuel treatment device according to the present embodiment will be described.

During Parking

The evaporated fuel treatment device according to the present embodiment generally keeps the sealing valve 28 in a closed state during the parking of the vehicle. When the sealing valve 28 is closed, the fuel tank 10 is separated from the canister 26 as long as the pressure control valve 30 is closed. Thus, in the evaporated fuel treatment device according to the present embodiment, the canister 26 adsorbs no more evaporated fuel during the parking of the vehicle, as long as the tank internal pressure Ptnk is lower than the forward direction valve opening pressure (20 kPa) of the pressure control valve 30. Similarly, the fuel tank 10 sucks no air during the parking of the vehicle, as long as the tank internal pressure Ptnk is higher than backward direction valve opening pressure (−15 kPa).

During Refueling

In the device according to the present embodiment, when the lid switch 62 is operated during the parking of the vehicle, the ECU 60 is first activated to open the sealing valve 28. At this time, if the tank internal pressure Ptnk is higher than the atmospheric pressure, the evaporated fuel in the fuel tank 10 flows into the canister 26 at the same time as the sealing valve 28 is opened, and is adsorbed by the activated carbon therein. Thus, the tank internal pressure Ptnk is reduced near the atmospheric pressure.

When the tank internal pressure Ptnk is reduced near the atmospheric pressure, the ECU 60 issues an instruction to unlock the lid 68 to the lid opener 64. Receiving the instruction, the lid opener 64 unlocks the lid 68. This allows an opening operation of the lid 68 after the tank internal pressure Ptnk reaches near the atmospheric pressure, in the device according to the present embodiment.

After allowance of the opening operation of the lid 68, the lid 68 is opened, a tank cap is opened, and then refueling is started. The tank internal pressure Ptnk is reduced near the atmospheric pressure before the tank cap is opened, thus the opening operation does not cause the evaporated fuel to be released from the refueling port 58 into the atmosphere.

The ECU 60 keeps the sealing valve 28 in an opened state until the refueling is finished (concretely, until the lid 68 is closed). Thus, a gas in the tank can flow into the canister 26 through the vapor passage 20 during the refueling, thereby ensuring good refueling properties. At this time, the flowing evaporated fuel is not released into the atmosphere because being adsorbed by the canister 26.

During Running

During running of the vehicle, control to purge the evaporated fuel adsorbed by the canister 26 is performed when a predetermined purge condition is satisfied. Concretely, in this control, the purge VSV 36 is appropriately subjected to duty driving, with the switching valve 80 being in OFF state and with the atmosphere hole 50 of the canister 26 being opened to the atmosphere. When the purge VSV 36 is subjected to the duty driving, induction negative pressure of the internal combustion engine is introduced into the purge hole 32 of the canister 26. Thus, the evaporated fuel in the canister 26 is purged into the intake passage 38 of the internal combustion engine, together with air sucked from the atmosphere hole 50.

During the running of the vehicle, the sealing valve 28 is appropriately opened so that the tank internal pressure Ptnk is kept near the atmospheric pressure, in order to reduce decompression time before the refueling. It should be noted that the opening of the valve is performed only during the purging of the evaporated fuel, that is, while the induction negative pressure is introduced into the purge hole 32 of the canister 26. In a state where the induction negative pressure is introduced into the purge hole 32, the evaporated fuel flowing out of the fuel tank 10 and into the canister 26 flows through the purge hole 32 without entering deeply inside the canister 26, and is then sucked into the intake passage 38. Thus, according to the device of the present embodiment, the canister 26 does not further adsorb a large amount of evaporated fuel during the running of the vehicle.

As described above, according to the evaporated fuel treatment device of the present embodiment, it is generally possible to limit the evaporated fuel adsorbed by the canister 26 only to the evaporated fuel flowing out of the fuel tank 10 during the refueling. Thus, the device according to the present embodiment allows reduction in size of the canister 26, and achieves satisfactory exhaust emission properties and good refueling properties.

[Description of a Sealing Valve Open Failure Diagnostic Check]

The evaporated fuel treatment device is required to be capable of achieving prompt detection of leakage in a line, a failure in the sealing valve 28, and other abnormalities that may degrade the emission characteristic. The evaporated fuel treatment device of the present embodiment is characterized by the fact that it conducts an open failure diagnostic check on the sealing valve 28 by a method described below.

While the sealing valve 28 of the device according to the present embodiment is closed, the fuel tank 10 becomes a hermetically closed space that is separated from the canister 26. Therefore, if the sealing valve 28 is closed, a significant difference may arise between a canister side pressure Pcani and a tank internal pressure Ptnk. If, on the other hand, the sealing valve 28 is open, there is continuity between the canister 26 and fuel tank 10; therefore, no significant difference arises between the pressures Pcani and Ptnk. In the device of the present embodiment, therefore, it can be concluded that no open failure exists in the sealing valve 28 as far as there is a significant difference between the pressures Pcani and Ptnk.

As described earlier, the device of the present embodiment generally keeps the sealing valve 28 in a closed state and the switching valve 80 in a nonenergized state while the vehicle is parked, that is, while the internal-combustion engine is stopped. When such status is properly achieved, the fuel tank 10 becomes hermetically closed with the canister 26 relieved to atmosphere. If this status persists for a long period of time, a significant difference should arise between the tank internal pressure Ptnk and the canister side pressure Pcani because the tank internal pressure Ptnk varies with the changes in the fuel temperature and evaporated fuel amount within the fuel tank 10. Thus, the device of the present embodiment concludes, if there is a significant difference between the tank internal pressure Ptnk and the canister side pressure Pcani under such a situation, that no open failure exists in the sealing valve 28. If, on the other hand, no such significant differential pressure is recognized, the device of the present embodiment concludes that an open failure exists in the sealing valve 28.

Figure 2:
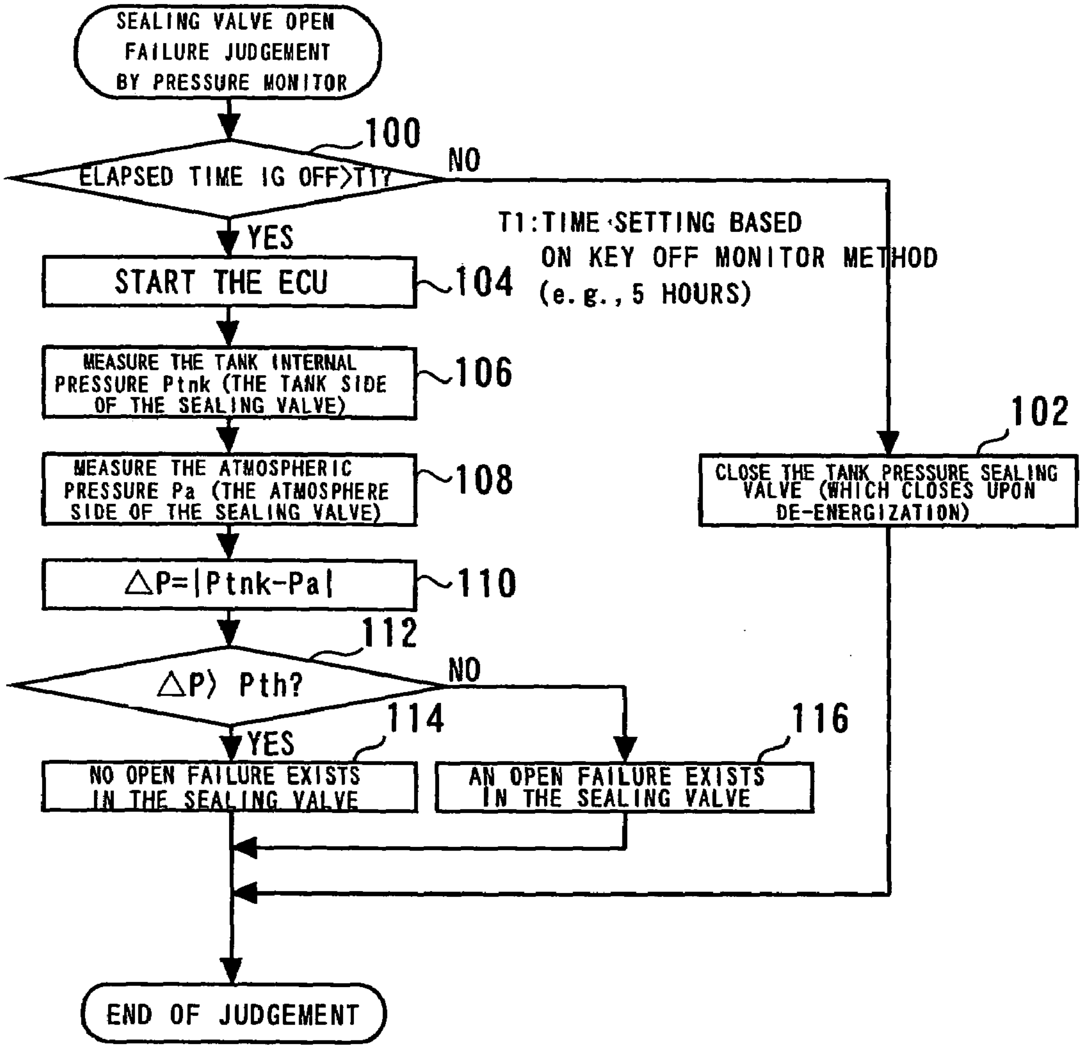
FIG. 2 is a flowchart of a control routine executed in the first embodiment of the present invention.

FIG. 2 is a flowchart illustrating a control routine that the ECU 60 according to the present embodiment executes to conduct an open failure diagnostic check on the sealing valve 28 in accordance with the above principles. This control routine is executed on the presumption that the ECU 60 starts counting in an ascending order with the soak timer when the vehicle settles down to a parked state.

When the vehicle settles down to the parked state, the ECU 60 starts counting in an ascending order with the soak timer and goes into a standby state in which only the routine shown in FIG. 2 can be executed. The routine shown in FIG. 2 is repeatedly started at predetermined time intervals while the vehicle is parked. This routine first checks whether the count reached by the soak timer indicates the elapse of a predetermined time T1, that is, whether the predetermined time T1 elapsed after the ignition (IG) switch was turned OFF (step 100).

The predetermined time T1 is defined as the length of time appropriate for invoking an adequate difference between the tank internal pressure Ptnk and the canister side pressure Pcani, that is, between the tank internal pressure Ptnk and the atmospheric pressure Pa, while the sealing valve 28 is properly closed after internal combustion engine stop. For the present embodiment, the time T1 is set at five hours.

If it is found in step 100 that the elapsed time after IG switch OFF is shorter than the predetermined time T1, it can be concluded that the time for an open failure diagnostic check has not arrived. In this instance, the current processing cycle terminates while the sealing valve 28 remains closed (step 102).

If, on the other hand, it is found that the elapsed time after IG switch OFF is equal to or longer that the predetermined time T1, a startup process for fully operating the ECU 60 is executed (step 104).

Next, the current tank internal pressure Ptnk is measured in accordance with the output from the tank internal pressure sensor 12 (step 106).

Next, the pump module pressure sensor 86 measures the current canister side pressure Pcani, that is, the atmospheric pressure Pa (step 108). At this point of time, the canister side pressure Pcani (atmospheric pressure Pa) can be measured by means of the pump module pressure sensor 86.

The next step (step 110) is then performed to measure a differential pressure ($\Delta P=|Ptnk-Pa|$) that is the difference between the tank internal pressure Ptnk, which was measured in step 106 above, and the atmospheric pressure Pa, which was measured in step 108 above.

The routine shown in FIG. 2 then checks whether the differential pressure ΔP, which was calculated in step 110, is greater than a predetermined judgment value Pth (step 112).

If the result of the check indicates that $\Delta P>Pth$, it can be judged that a significant differential pressure is generated between both sides of the sealing valve 28, that is, the sealing valve 28 is closed. In this instance, the routine concludes that no open failure exists in the sealing valve 28 (step 114) and then terminates the current processing cycle.

If, on the other hand, the result of the check does not indicate that $\Delta P>Pth$, it can be judged that the significant differential pressure is not generated between both sides of the sealing valve 28 although it should be. In this instance, the routine concludes that an open failure exists in the sealing valve 28 (step 116) and then terminates the current processing cycle.

As described above, the routine shown in FIG. 2 can determine whether an open failure exists in the sealing valve 28 by checking whether a significant differential pressure ΔP is generated between both sides of the sealing valve 28 when the situation where the sealing valve 28 should be closed continues for the predetermined time T1 after an internal combustion engine stop. The use of the above judgment method makes it possible to conduct an open failure diagnostic check after the elapse of an adequate period of time while the internal combustion engine is stopped. As a result, simple control can be exercised to conduct an accurate open failure diagnostic check without being affected, for instance, by fuel consumption or evaporated fuel generation.

In the second embodiment, which has been described above, an open failure diagnostic check is conducted on the sealing valve 28 when the predetermined time T1 elapses after an internal combustion engine stop. However, the open failure diagnostic check on the sealing valve 28 may be conducted at an alternative time. More specifically, in a situation where all things to do is merely making sure that no open failure exists in the sealing valve 28, the routine may calculate the differential pressure ΔP generated between both sides of the sealing valve 28 at an arbitrary time and conclude, if a significant differential pressure ΔP is recognized at any time, that no open failure exists in the sealing valve 28.

In the second embodiment, which has been described above, elapse of the predetermined time T1 after an internal combustion engine stop is treated as a differential pressure generation condition, that is, the condition necessary to be satisfied for a significant differential pressure ΔP being generated between the canister side pressure Pcani (atmospheric pressure Pa) and the tank internal pressure Ptnk. However, an alternative condition may be imposed. More specifically, satisfaction of the differential pressure generation condition may be determined upon one of the following alternative conditions:

Whether, after stoppage of the internal combustion engine and closure of the sealing valve 28, the ambient temperature is changed as needed to generate a significant differential pressure ΔP Whether, after stoppage of the internal combustion engine and closure of the sealing valve 28, the fuel temperature is changed as needed to generate a significant differential pressure ΔP Whether, after stoppage of the internal combustion engine and closure of the sealing valve 28, the atmospheric pressure is changed as needed to generate a significant differential pressure ΔP Whether, after stoppage of the internal combustion engine and closure of the sealing valve 28, the difference between the ambient temperature and fuel temperature (|ambient temperature−fuel temperature|) is changed as needed to generate a significant differential pressure ΔP

Second Embodiment

Figure 3:
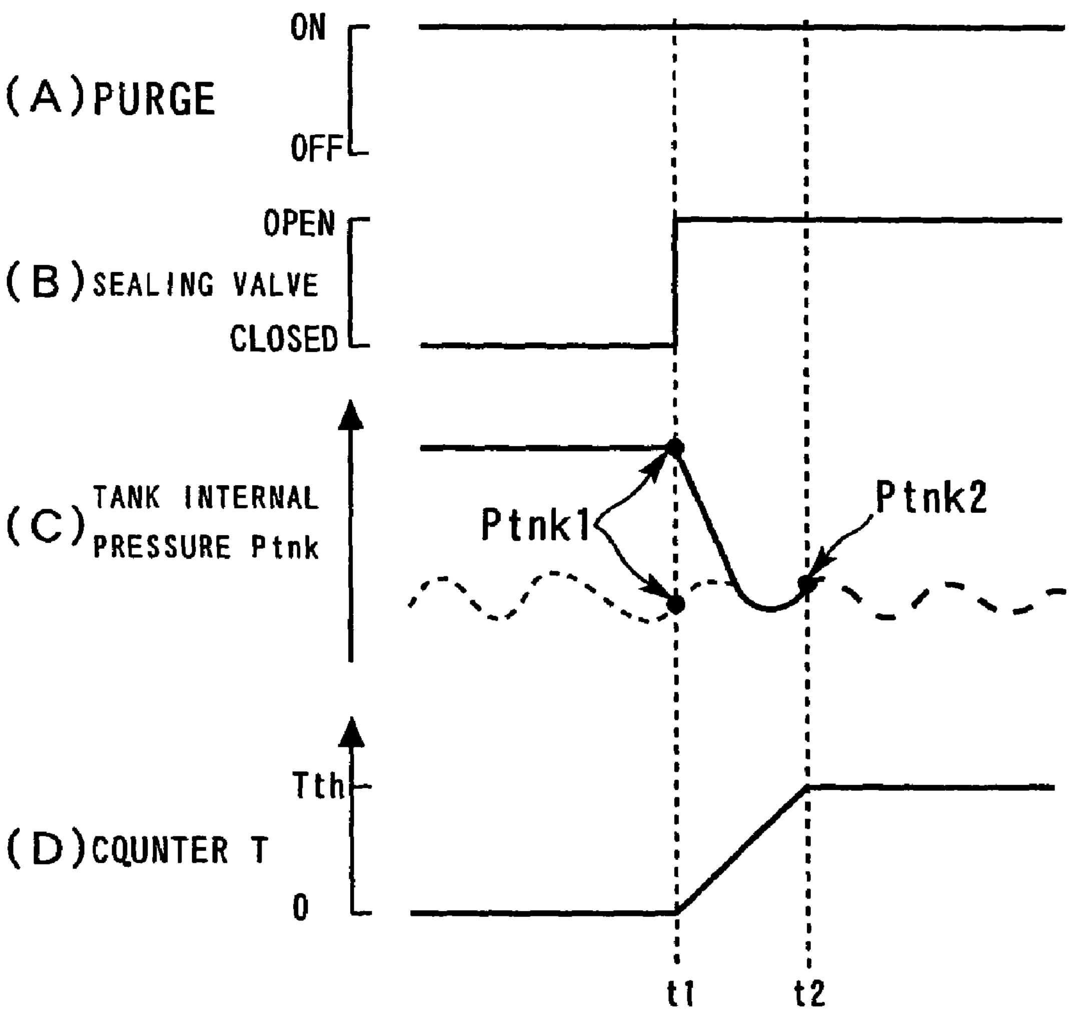
FIGS. 3A through 3D are timing diagrams for describing principal of open failure diagnosis conducted on a sealing valve in a second embodiment of the present invention.

A second embodiment of the present invention will now be described with reference to FIGS. 3 and 4. The evaporated fuel treatment device of the present embodiment can be implemented by modifying the device accordigo to the first embodiment such that the ECU 60 executes a routine shown in FIG. 4, which will be described later, instead of the routine shown in FIG. 2 or in conjunction with that routine.

FIGS. 3A through 3D are timing diagrams, which illustrate the principles of an open failure diagnostic check that is to be conducted on the sealing valve 28 by the device of the present embodiment. More specifically, FIG. 3A represents a waveform that indicates how the evaporated fuel passing from the canister 26 to the intake passage 38 is purged; FIG. 3B represents a waveform of an open/close instruction for the sealing valve 28; FIG. 3C indicates how the tank internal pressure Ptnk changes; and FIG. 3D shows changes in the count reached by the counter T, which is used during an open failure diagnostic check process.

FIG. 3A indicates that a purge is constantly performed during the depicted period. Under such a circumstance, FIG. 3B indicates that a valve close instruction is issued to the sealing valve 28 until time t1 and that the valve close instruction is superseded by a valve open instruction at time t1.

The waveform depicted by a solid line in FIG. 3C indicates how the tank internal pressure Ptnk changes when the sealing valve 28 switches from the closed state to the open state in compliance with the above valve close and valve open instructions. As far as the sealing valve 28 is properly closed before time t1, the intake negative pressure introduced into the canister 26 upon a purge is blocked by the sealing valve 28 from entering the fuel tank 10. After the sealing valve 28 properly opens at time t1, the intake negative pressure begins to be introduced into the fuel tank 10 so that the tank internal pressure Ptnk suddenly lowers.

The waveform depicted by a broken line in FIG. 3C indicates how the tank internal pressure Ptnk varies when an open failure exists in the sealing valve 28. If an open failure exists in the sealing valve 28, the intake negative pressure enters the fuel tank 10 since before time t1. Therefore, the tank internal pressure Ptnk is adequately low since before time t1. In this instance, the tank internal pressure Ptnk does not greatly change even if the instruction for the sealing valve 28 switches from a valve close instruction to a valve open instruction at time t1.

As indicated in FIG. 3D, the ECU 60 begins to increment the counter T after the instruction for the sealing valve 28 switches from a valve close instruction to a valve open instruction at time t1. The counter T continues to increment until its count reaches a predetermined value Tth. The predetermined value Tth is preset in accordance with the time required for the tank internal pressure Ptnk significantly changing under a circumstance where the sealing valve 28 normally functions. Time t2 shown in FIG. 3D represents the time at which the counter T reaches a count of Tth.

In the present embodiment, the ECU 60 calculates the difference ΔP1 between the tank internal pressure Ptnk1 at time t1 and the tank internal pressure Ptnk2 at time t2, and determines whether the sealing valve 28 functions normally by checking whether the calculated difference ΔP1 represents a significant value. When this judgment method is used, simple control can be exercised to accurately determine whether the sealing valve 28 functions normally in response to a valve open instruction and valve close instruction.

If a close failure exists in the sealing valve 28, the tank internal pressure Ptnk1 prevalent before time t1 is retained even after time t1 in the timing diagrams shown in FIGS. 3A through 3D. In this instance, the value ΔP of the expression |Ptnk1−Ptnk2| is insignificant as is the case with an open failure in the sealing valve 28. Therefore, in a case where an abnormality in the sealing valve 28 is diagnosed based on the difference ΔP between the values Ptnk1 and Ptnk2, it is impossible to identify the abnormality arising in the sealing valve 28 with either an open failure or a close failure.

Therefore, in addition to an open failure diagnostic check routine for the sealing valve 28, which will be described later with reference to FIG. 4, the device of the present embodiment executes a process for conducting a close failure diagnostic check on the sealing valve 28 (this process will be described later in detail), so that conducting an open failure diagnostic check on the sealing valve 28 only when it can conclude that there is no record concerning a close failure in the sealing valve 28. Consequently, the device of the present embodiment can accurately judge whether an open failure exists in the sealing valve 28 by executing a routine shown in FIG. 4, which will be described later.

Figure 4:
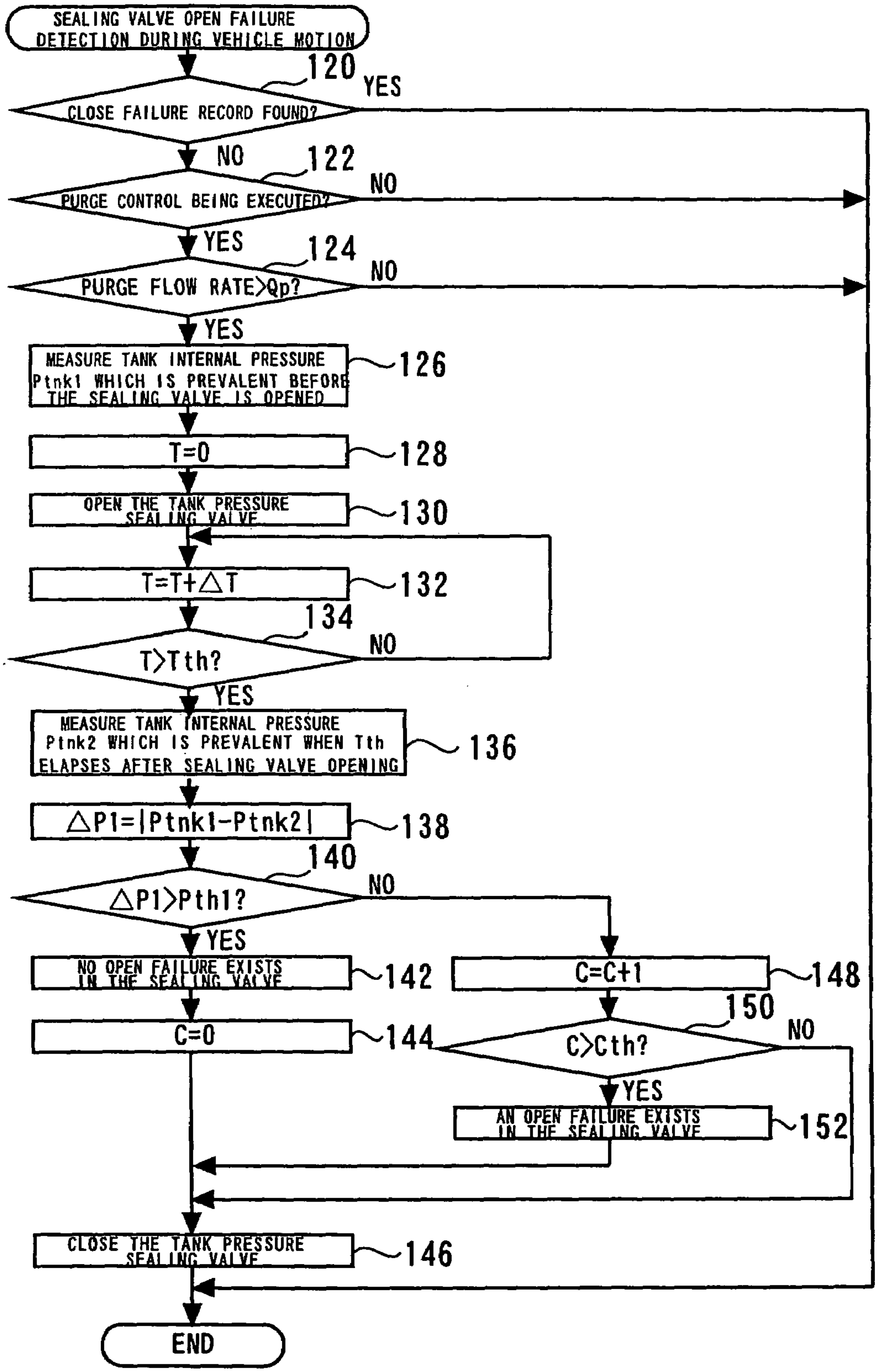
FIG. 4 is a flowchart of a control routine executed in the second embodiment of the present invention.

FIG. 4 is a flowchart illustrating a control routine that the ECU 60 executes to implement the above function in the present embodiment. The routine shown in FIG. 4 is repeatedly started at predetermined intervals during an internal combustion engine operation.

The routine shown in FIG. 4 first checks whether there is a record concerning a close failure in the sealing valve 28 (step 120). As a precondition for the execution of processing step 120, the ECU 60 uses another routine to conduct a close failure diagnostic check on the sealing valve 28 and makes a record concerning a close failure in accordance with the result of the diagnostic check. For example, the close failure diagnostic check on the sealing valve 28 can be conducted in the following manner:

The ECU 60 introduces pressure while a valve close instruction is given to the sealing valve 28 into the canister 26 side.

If a significant difference arises between the canister side pressure Pcani and the tank internal pressure Ptnk as a result of the above pressure introduction, the valve close instruction for the sealing valve 28 is superseded by a valve open instruction.

If a significant change occurs in the tank internal pressure Ptnk when the instruction is changed as described above, the ECU 60 concludes that no close failure exists in the sealing valve 28. If no such significant change occurs, however, the ECU 60 concludes that a close failure exists in the sealing valve 28.

In step (3) above, the ECU 60 judges whether the tank internal pressure Ptnk is significantly changed upon an instruction change. However, step (3) may be performed in an alternative manner so as to check after an instruction change whether the pressure differential ΔP between the tank internal pressure Ptnk and the canister side pressure Pcani (ΔP=|Ptnk−Pcani|) is obliterated.

If the routine shown in FIG. 4 concludes that the condition for step 120 above is established, that is, a record concerning a close failure in the sealing valve 28 is found, the routine terminates the current processing cycle without continuing to conduct an open failure diagnostic check on the sealing valve 28. However, if no close failure record is found in step 120, the routine continues to check whether an evaporated fuel purge is performed (step 122).

If the result of the check indicates that an evaporated fuel purge is not performed, the routine terminates the current processing cycle immediately without continuing to conduct an open failure diagnostic check. If, on the other hand, the result of the check indicates that an evaporated fuel purge is performed the routine continues to check whether the purge flow rate is higher than a threshold value Qp (step 124).

If the sealing valve 28 opens during a purge, the intake negative pressure introduced into the canister 26 is introduced into the fuel tank 10 as well. As a result, the tank internal pressure Ptnk tends to decrease. The higher the purge flow rate, the more remarkable the resulting decrease in the tank internal pressure Ptnk. The above threshold value Qp is a purge flow rate boundary value for causing a recognizable, significant change in the tank internal pressure Ptnk when the sealing valve 28 opens.

Therefore, if it is found in step 124 that the purge flow rate is not higher than the threshold value Qp, it can be concluded that no detectable, significant change might occur in the tank internal pressure Ptnk even if the sealing valve 28 properly switches from the closed state to the open state. In this instance, the routine shown in FIG. 4 terminates the current processing cycle without conducting an open failure diagnostic check on the sealing valve 28.

If it found in step 124 that the purge flow rate is higher than the threshold value Qp, it can be concluded that a detectable, significant change can occur in the tank internal pressure Ptnk if the sealing valve 28 properly switches from the closed state to the open state. In this instance, the routine shown in FIG. 4 first measures, for the purpose of conducting an open failure diagnostic check on the sealing valve 28, the current tank internal pressure, that is, the tank internal pressure Ptnk1 prevalent before the change in the instruction for the sealing valve 28 from a valve close instruction to a valve open instruction (step 126).

After the tank internal pressure Ptnk1 is measured, the count reached by the counter T resets to 0 (step 128). Further, the instruction for the sealing valve 28 changes from a valve close instruction to a valve open instruction (step 130).

Subsequently, increment of the counter T (step 132) and judgment of T>Tth (step 134) are repeatedly executed. If the count reached by the counter T is found in step 134 to be greater than a predetermined value Tth, the routine measures the prevalent tank internal pressure Ptnk2 (step 136). The above predetermined value Tth represents the time required for causing a significant change in the tank internal pressure Ptnk after time t1 when the sealing valve 28 properly operates as described earlier with reference to FIG. 3.

Next, the routine shown in FIG. 4 checks whether the difference (ΔP1=|Ptnk1−Ptnk2|) between the tank internal pressure Ptnk1, which was measured in step 126, and the tank internal pressure Ptnk2, which was measured in step 138, is greater than a predetermined value Pth1. More specifically, the routine checks whether the tank internal pressure Ptnk is significantly changed when the instruction for the sealing valve 28 changes (step 140).

If the result of the check indicates that the value ΔP1 is greater than the value Pth1, it can be judged that the sealing valve 28 has properly switched from the closed state to the open state in accordance with a change in the instruction. In this instance, the routine concludes that no open failure exists in the sealing valve 28 (step 142), resets a temporary abnormality judgment counter C to zero (step 144), switches the instruction for the sealing valve 146 back to a valve close instruction (step 146), and then terminates the current processing cycle.

If, on the other hand, it is found in step 140 that the value ΔP1 is not greater than the value Pth1, that is, no significant change has occurred in the tank internal pressure Ptnk, the routine increments the temporary abnormality judgment counter C by one (step 148) and then checks whether a judgment value Cth is exceeded by the resulting count C (step 150).

If the result of the check indicates that the resulting count C is not greater than the judgment value Cth, the routine executes processing step 146 while suspending judgment on an open failure in the sealing valve 28. If, as a result of subsequent repetition of the routine shown in FIG. 4, it is found in step 150 that the count C is greater than the judgment value Cth, the routine concludes that an open failure exists in the sealing valve 28 (step 152).

As described above, the routine shown in FIG. 4 can accurately judge whether an open failure exists in the sealing valve 28 by conducting an open failure diagnostic check on the sealing valve 28 in a situation where there is no record concerning a close failure in the sealing valve 28. Additionally, the routine shown in FIG. 4 can conduct an open failure diagnostic check by judging whether the tank internal pressure Ptnk significantly changes when the instruction for the sealing valve 28 switches from a valve close instruction to a valve open instruction in a situation where an adequate negative pressure is introduced into the canister 26. In other words, the routine shown in FIG. 4 can conduct an open failure diagnostic check on the sealing valve 28 while checking the tank internal pressure Ptnk under a circumstance where a significant difference arises therein depending on whether the sealing valve 28 functions normally. Thus, the device of the present embodiment can exercise simple control to conduct an accurate open failure diagnostic check on the sealing valve 28 without being affected by evaporated fuel generation or fuel consumption within the fuel tank 10.

The foregoing description of the second embodiment assumes that a negative pressure is continuously introduced into the canister 26 even after the instruction for the sealing valve 28 switches from a valve close instruction to a valve open instruction. However, the present invention is not limited to the above description. That is, the principal of the present invention is that creating a situation where a remarkable change should occur in the tank internal pressure Ptnk and checking for such a remarkable change to judge whether an open failure exists. Therefore, the device of the present invention may alternatively introduce a negative pressure until an adequate difference arises between the canister side pressure Pcani and the tank internal pressure Ptnk, then stop the negative pressure introduction operation, and switch the instruction for the sealing valve 28 from a valve close instruction to a valve open instruction in order to conduct an open failure diagnostic check.

Although the foregoing description of the second embodiment also assumes that an intake negative pressure is used to achieve necessary pressure introduction for an open failure diagnostic check on the sealing valve 28, an alternative pressure introduction method may be employed. More specifically, the pump 74 may alternatively be operated to accomplish pressure introduction as needed for an open failure diagnostic check on the sealing valve 28.

Further, the foregoing description of the second embodiment assumes that an open failure diagnostic check is conducted by switching the instruction for the sealing valve 28 from a valve close instruction to a valve open instruction to determine whether a significant change occurs in the tank internal pressure Ptnk. However, an alternative method may be employed for conducting an open failure diagnostic check on the sealing valve 28. For example, a positive or negative pressure may be introduced into either the fuel tank 10 or canister 26 while issuing a valve close instruction to the sealing valve 28 in order to conduct an open failure diagnostic check on the sealing valve 28 by checking whether pressure change following such pressure introduction occurs in the fuel tank 10 or canister 26. Still another method for conducting an open failure diagnostic check on the sealing valve 28 is to introduce a positive or negative pressure into either the fuel tank 10 or canister 26 while issuing a valve close instruction to the sealing valve 28 and check whether a predefined pressure change, which should occur in a situation where the sealing valve 28 is closed, actually occurs within a space into which the pressure is introduced.

Furthermore, the foregoing description of the second embodiment assumes that an open failure is conducted on the sealing valve 28 after the check on the record concerning a close failure in the sealing valve 28. However, the present invention is not limited to the above description. More specifically, processing steps 122 and beyond may be executed without checking the record concerning a close failure in the sealing valve 28 for the mere purpose of judging that no open failure exists in the sealing valve 28 (and suspending judgment on the occurrence of an open failure).

The major benefits of the present invention described above are summarized as follows:

According to a first aspect of the present invention, it is possible to conclude that no open failure exists in the sealing valve when the difference detected between the canister side pressure and tank internal pressure is greater than a judgment value. If an open failure exists in the sealing valve, the generated differential pressure does not exceed the judgment value. The use of the method according to the present invention makes it possible to conduct a diagnostic check in an extremely simple manner to verify that no open failure exists in a valve mechanism positioned between the canister and fuel tank, that is, the sealing valve.

According to a second aspect of the present invention, it is possible to conclude that an open failure exists in the sealing valve if no difference greater than the judgment value is detected between the canister side pressure and tank internal pressure when the differential pressure generation condition which should be established when the sealing valve is expected to be closed and that there is expected to be generated adequate differential pressure between both sides of the sealing valve is established. The use of the method according to the present invention makes it possible to conduct a diagnostic check in a simple manner to verify that an open failure exists in the sealing valve.

According to a third aspect of the present invention, it is possible to conclude that the differential pressure generation condition is established, when a predetermined period of time is elapses after the sealing valve is closed with the internal combustion engine stopped, thereby an adequate difference between the canister side pressure and tank internal pressure can be estimated.

According to a fourth aspect of the present invention, it is possible to conclude that the differential pressure generation condition is established, when an adequate change occurs in the ambient temperature after the sealing valve is closed with the internal combustion engine stopped, thereby an adequate difference between the canister side pressure and tank internal pressure can be estimated.

According to a fifth aspect of the present invention, it is possible to conclude that the differential pressure generation condition is established, when an adequate change occurs in the fuel temperature after the sealing valve is closed with the internal combustion engine stopped, thereby an adequate difference between the canister side pressure and tank internal pressure can be estimated.

According to a sixth aspect of the present invention, it is possible to conclude that the differential pressure generation condition is established, when an adequate change occurs in the atmospheric pressure after the sealing valve is closed with the internal combustion engine stopped, thereby an adequate difference between the canister side pressure and tank internal pressure can be estimated.

According to a seventh aspect of the present invention, it is possible to conclude that the differential pressure generation condition is established, when an adequate change occurs in the difference between the fuel temperature and ambient temperature after the sealing valve is closed with the internal combustion engine stopped, thereby an adequate difference between the canister side pressure and tank internal pressure can be estimated.

According to the eighth aspect of the present invention, it is possible to change the sealing valve status from closed to open while introducing pressure into either the canister or fuel tank. If the sealing valve properly changes its status, a significant pressure change occurs, upon the issuance of a valve open instruction, in the canister or fuel tank to which the pressure is not introduced. If, on the other hand, the sealing valve does not properly change its status, no such significant pressure change occurs upon the issuance of a valve open instruction. If the above-mentioned significant pressure change is not recognized in a situation where no close failure exists in the sealing valve, the present invention can judge that an open failure exists in the sealing valve. The use of this judgment method makes it possible to exercise simple control in order to conduct an accurate open failure diagnostic check on the sealing valve without being affected by fuel consumption or evaporated fuel generation.

Further, the present invention is not limited to these embodiments, but variations and modifications may be made without departing from the scope of the present invention.

The entire disclosure of Japanese Patent Application No. 2002-321687 filed on Nov. 5, 2003 including specification, claims, drawings and summary are incorporated herein by reference in its entirety.

What is claimed is:

1. An evaporated fuel treatment device for internal combustion engine that uses a canister to absorb evaporated fuel generated in a fuel tank for evaporated fuel treatment purposes, said device comprising:

a sealing valve for controlling the continuity between said fuel tank and said canister;

a close failure judgment means for judging whether a close failure exists in said sealing valve;

a pressure introduction means for introducing pressure into either said canister or said fuel tank in a situation where said sealing valve is closed;

a sealing valve open instruction generation means for issuing a valve open instruction to said sealing valve in a situation where pressure is introduced into either said canister or said fuel tank by said pressure introduction means;

a pressure change judgment means for conducting a check, before and after the issuance of said valve open instruction, to judge whether a significant pressure change occurs in said canister or said fuel tank to which pressure is not introduced; and an open failure abnormality judgment means for making a judgment that an open failure exists in said sealing valve when said significant pressure change is not verified by said pressure change judgment means under a circumstance where no close failure record exists.

* * * * *

UNITED STATES PATENT AND TRADEMARK OFFICE

CERTIFICATE OF CORRECTION

PATENT NO. : 7,082,815 B1
APPLICATION NO. : 11/387933
DATED : August 1, 2006
INVENTOR(S) : Takuji Matsubara et al.

It is certified that error appears in the above-identified patent and that said Letters Patent is hereby corrected as shown below:

| **Column** | **Line** | |
|---|---|---|
| 4 | 27 | Change "FIG. **11**B" to --FIG. **1**B--. |

Signed and Sealed this

Tenth Day of July, 2007

JON W. DUDAS
*Director of the United States Patent and Trademark Office*